United States Patent
Yoshida et al.

(10) Patent No.: US 11,864,141 B2
(45) Date of Patent: Jan. 2, 2024

(54) WIRELESS COMMUNICATION SYSTEM PERFORMING MUTUAL WIRELESS COMMUNICATION BETWEEN TERMINALS TO PERFORM TIME DIFFERENCE MEASUREMENT AND PROPAGATION TIME MEASUREMENT

(71) Applicant: NATIONAL INSTITUTE OF INFORMATION AND COMMUNICATIONS TECHNOLOGY, Koganei (JP)

(72) Inventors: Maki Yoshida, Tokyo (JP); Nobuyasu Shiga, Sunnyvale, CA (US); Satoshi Yasuda, Tokyo (JP); Kenichi Takizawa, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 102 days.

(21) Appl. No.: 17/537,139

(22) Filed: Nov. 29, 2021

(65) Prior Publication Data
US 2023/0171726 A1 Jun. 1, 2023

(51) Int. Cl.
H04W 56/00 (2009.01)
H04W 24/10 (2009.01)
H04W 24/08 (2009.01)

(52) U.S. Cl.
CPC ....... *H04W 56/0035* (2013.01); *H04W 24/10* (2013.01); *H04W 56/004* (2013.01); *H04W 56/0055* (2013.01); *H04W 24/08* (2013.01)

(58) Field of Classification Search
CPC ...... H04W 4/70; H04W 4/80; H04W 28/0875
See application file for complete search history.

(56) References Cited

U.S. PATENT DOCUMENTS

2007/0060079 A1* 3/2007 Nakagawa ........... G01S 5/06
455/131
2009/0279512 A1* 11/2009 Fujishima ........... H04W 72/542
370/336

(Continued)

FOREIGN PATENT DOCUMENTS

JP 2005142980 A 6/2005

OTHER PUBLICATIONS

Shiga, et al., "Demonstration of wireless two-way interferometry (Wi-Wi)", IEICE Communications Express, vol. 6, No. 2, pp. 77-82 (2017).

(Continued)

*Primary Examiner* — San Htun
(74) *Attorney, Agent, or Firm* — Holtz, Holtz & Volek PC

(57) ABSTRACT

In performing wireless communication between terminals to perform time difference measurement and propagation time measurement, first and second terminals that transmit a signal at least once in attempting space-time synchronization are included. The first terminal measures a reception phase of a locally transmitted signal, and a reception phase of a signal transmitted by the second terminal, adds a positive or negative phase to the measured reception phase, and makes a report to the second terminal. The second terminal measures a reception phase of a locally transmitted signal, and a reception phase of a signal transmitted by the first terminal, and makes a report to the first terminal. The first and second terminals obtain a time difference or propagation time according to a reception phase measured by a local device and reported from a counterpart, and obtain additional information based on a phase reflected in the time difference or propagation time.

6 Claims, 15 Drawing Sheets

(56) References Cited

U.S. PATENT DOCUMENTS

| | | | | |
|---|---|---|---|---|
| 2012/0300814 | A1* | 11/2012 | Schaffner | G01S 11/04 |
| | | | | 375/139 |
| 2015/0280841 | A1* | 10/2015 | Gudovskiy | H04B 17/20 |
| | | | | 375/226 |
| 2016/0219544 | A1* | 7/2016 | Park | H04L 27/364 |
| 2020/0403652 | A1* | 12/2020 | Goff | H04B 1/7075 |
| 2022/0174632 | A1* | 6/2022 | Khoury | H04W 56/005 |

OTHER PUBLICATIONS

International Search Report (ISR) dated Jan. 10, 2023, issued in International Application No. PCT/JP2022/040330.

Yamasaki, et al., "Delay-Bounded Wireless Network Based on Precise Time Synchronization Using Wireless Two-Way Interferometry", IEEE Access, Jun. 18, 2021, vol. 9, pp. 85084-85100 Section 3.

\* cited by examiner

WIRELESS COMMUNICATION SYSTEM PERFORMING MUTUAL WIRELESS COMMUNICATION BETWEEN TERMINALS TO PERFORM TIME DIFFERENCE MEASUREMENT AND PROPAGATION TIME MEASUREMENT

BACKGROUND

Technical Field

The present invention relates to a wireless communication system that performs mutual wireless communication between terminals and performs time difference measurement and communication propagation time measurement (hereinafter referred to as "space-time synchronization").

Related Art

In recent years, a study on wireless two-way interferometry (Wi-Wi) has made progress. In Wi-Wi, signals of wireless communication are transmitted/received between terminals in two ways, and a distance and a time difference are measured with high precision, and therefore space-time synchronization is performed (see, for example, N. Shiga, K. Kido, S. Yasuda, B. Patna, Y. Hanado, S. Kawamura, H. Hanado, K. Takizawa, and M. Inoue, "Demonstration of wireless two-way interferometry (Wi-Wi)", IEICE Communications Express, Vol. 6, No. 2, pp. 77-82 (2017)).

Meanwhile, internet of things (IoT) devices have rapidly spread. In a case where Wi-Wi is applied to wireless communication using IoT devices, an important issue is how the security of information to be wirelessly communicated is to be secured.

Conventionally, the application of various types of cryptographic techniques has been considered in order to secure the security of information to be wirelessly communicated. Conventionally, the use of an algorithm such as common key cryptography has also been considered. However, a user needs to set a key each time, and there is a problem of an increase in effort. In addition, in a method using public key cryptography, a dedicated calculation resource is required. In a method using common key cryptography, it is inevitable that a transmission side and a reception side will share a private key in advance. This similarly results in an increase in effort. Further, a method using quantum key delivery has also been considered. Security can be secured, but infrastructure required to achieve quantum key distribution needs to be developed, and this has a problem in which it takes time and cost for wide spread.

In a case where the security of information to be wirelessly communicated is similarly pursued in a case where Wi-Wi is applied to wireless communication using IoT devices, as described above, there is a problem in which a huge infrastructure investment is required in addition to the complexity of key management in any of the methods described above.

SUMMARY

Accordingly, the present invention has been made in view of the problems described above, and it is an object of the present invention to provide a wireless communication system that can improve the security of information to be wirelessly communicated, can be achieved in a safe, inexpensive, and simple method, and is suitable to widely spread the entire system in society, in a case where Wi-Wi is applied to wireless communication using IoT devices in the time when several trillion IoT devices are mounted.

A wireless communication system according to a first invention performs mutual wireless communication between terminals to perform time difference measurement and propagation time measurement. The wireless communication system includes a first terminal and a second terminal that transmit a signal at least once in attempting space-time synchronization. The first terminal measures a reception phase $\varphi_{AA}$ of a signal that the first terminal itself has transmitted, and a reception phase $\varphi_{BA}$ of a signal that the second terminal has transmitted, adds a positive or negative phase $\Delta\varphi$ to the reception phase $\varphi_{AA}$ and/or the reception phase $\varphi_{BA}$ that have been measured, and reports the reception phase $\varphi_{AA}$ and/or the reception phase $\varphi_{BA}$ to the second terminal. The second terminal measures a reception phase $\varphi_{BB}$ of a signal that the second terminal itself has transmitted, and a reception phase PAB of a signal that the first terminal has transmitted, and reports, to the first terminal, the reception phase $\varphi_{BB}$ and the reception phase PAB that have been measured. Further, the first terminal and the second terminal obtain a time difference or a propagation time between the first terminal and the second terminal in accordance with a reception phase that has been measured by a local device or has been reported from a counterpart, and obtain information based on a phase $\Delta\varphi$ that has been reflected in the time difference or the propagation time that has been obtained.

A wireless communication system according to a second invention performs mutual wireless communication between terminals to perform time difference measurement and communication propagation time measurement. The wireless communication system includes a first terminal and a second terminal that transmit a signal at least once in attempting space-time synchronization. The first terminal measures a reception phase SAA of a signal that the first terminal itself has transmitted, and a reception phase $\varphi_{BA}$ of a signal that the second terminal has transmitted, adds a positive or negative phase $\Delta\varphi$ to the reception phase $\varphi_{AA}$ and/or the reception phase $\varphi_{BA}$ that have been measured, and reports the reception phase $\varphi_{AA}$ and/or the reception phase $\varphi_{BA}$ to the second terminal. The second terminal measures a reception phase $\varphi_{BB}$ of a signal that the second terminal itself has transmitted, and a reception phase PAB of a signal that the first terminal has transmitted, obtains a time difference or a propagation time between the first terminal and the second terminal in accordance with the reception phase $\varphi_{BB}$ and the reception phase PAB that have been measured and the reception phase $\varphi_{AA}$ and/or the reception phase $\varphi_{BA}$ that have been reported from the first terminal, and obtains information based on a phase $\Delta\varphi$ that has been reflected in the time difference or the propagation time that has been obtained.

In the first invention, in a wireless communication system according to a third invention, the first terminal and/or the second terminal transmit a signal obtained by causing an internally mounted oscillator to change a transmission phase at random or by a predetermined amount.

In the first invention, a wireless communication system according to a fourth invention further includes a noise addition unit that adds noise that changes in time series in a propagation environment between the first terminal and the second terminal.

In the first invention, in a wireless communication system according to a fifth invention, the first terminal controls an amount of a phase $\Delta\varphi$ to be added to the reception phase SAA and/or the reception phase $\varphi_{BA}$ that have been measured, in accordance with the previously obtained (measured and/or reported) reception phases.

In the first invention, in a wireless communication system according to a sixth invention, the first terminal continues to intermittently add a phase $\Delta\varphi$ at an arbitrary timing in reporting the reception phase SAA and/or the reception phase $\varphi_{BA}$ that have been measured, and makes a data group to include dummy information or authentic information at an arbitrary timing in generating the data group, changes in the time difference or the propagation time due to the phase $\Delta\varphi$ that has been added being arranged in time series in the data group.

According to the present invention having the configuration described above, in a case where Wi-Wi is applied to wireless communication, the security of information to be wirelessly communicated can be improved, and the wireless communication can be achieved in a safe, inexpensive, and simple method.

DETAILED DESCRIPTION

A wireless communication system to which the present invention has been applied is described in detail below.

Figure 1:
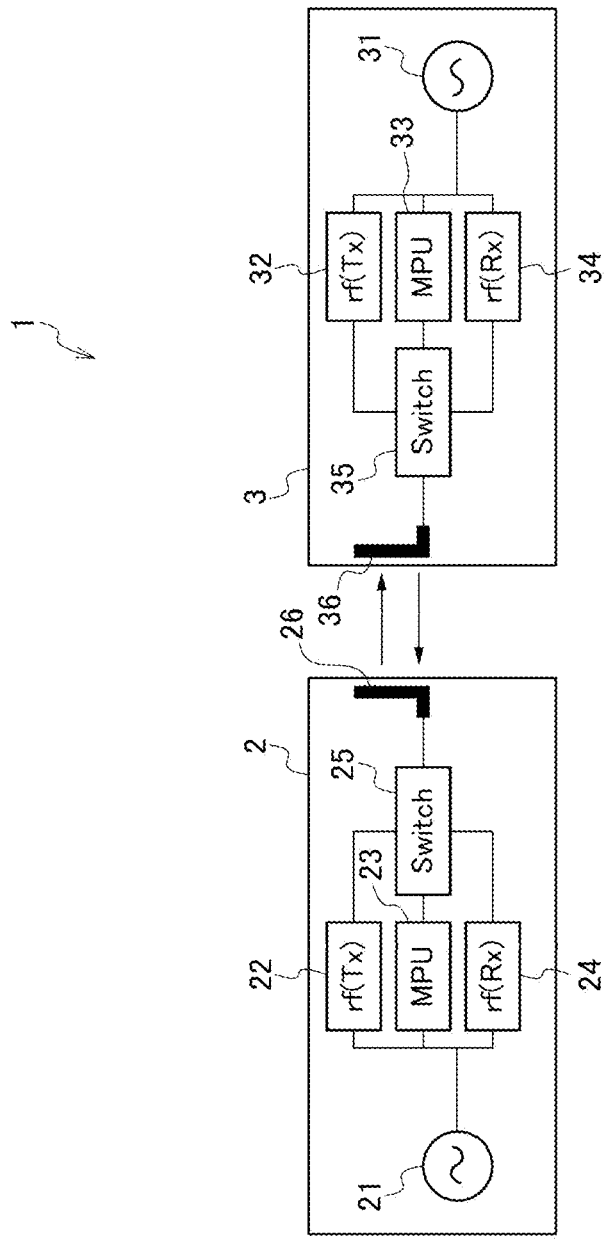
FIG. 1 is a block configuration diagram illustrating a wireless communication system to which the present invention has been applied.

FIG. 1 is a block configuration diagram illustrating a wireless communication system 1 to which the present invention has been applied. The wireless communication system 1 includes a terminal 2 and a terminal 3 as terminal devices for wireless communication.

The terminals 2 and 3 may be what is called an IoT device, or may include a device that is applied to each node in a case where a tree type topology is configured.

Further, the terminals 2 and 3 may be embodied as a terminal device that can perform wireless communication, such as a portable telephone, a smartphone, a tablet type terminal, a wearable terminal, or a notebook type personal computer (PC).

The terminal 2 includes an oscillator 21, a transmission unit 22, a control unit 23, and a reception unit 24 that are connected to the oscillator 21, a switch 25 that is connected to the transmission unit 22, the control unit 23, and the reception unit 24, and a communication interface 26 that is connected to the switch 25.

Similarly, the terminal 3 includes an oscillator 31, a transmission unit 32, a control unit 33, and a reception unit 34 that are connected to the oscillator 31, a switch 35 that is connected to the transmission unit 32, the control unit 33, and the reception unit 34, and a communication interface 36 that is connected to the switch 35.

The oscillator 21 operates under the control of the control unit 23, generates an electric signal having an alternating current waveform that has been generated on the basis of time information set in the local device, and supplies the electric signal to the transmission unit 22.

The oscillator 21 may have a function of adjusting a frequency in accordance with control information that has been supplied from the control unit 23. In addition, the oscillator 21 plays the role of providing time information or the like required to measure a phase for a signal received by the reception unit 24.

The transmission unit 22 performs, on a signal supplied from the oscillator 21, superimposition processing, various types of modulation processing, filtering, or the like using an intermediate frequency required for transmission using radio waves.

The control unit 23 plays the role of a central control unit that controls the entirety of the terminal 2, and includes, for example, a micro processing unit (MPU). The control unit 23 controls various types of processing required for space-time synchronization, such as measurement of the reception phase described below, a report of the measured reception phase to a counterpart terminal 3, calculation of a time difference or a propagation time between the terminal 2 and the terminal 3, or time synchronization using feedback to a frequency of the oscillator 21. The space-time synchronization here means time difference measurement and communication propagation time measurement.

The reception unit 24 performs various types of demodulation processing, filtering, or the like on a signal that has been received through the communication interface 26 or a signal that has been received from the transmission unit 22 through the switch 25.

The switch 25 switches connection of the transmission unit 22 or the reception unit 24 to the communication interface 26 under the control of the control unit 23. In such a case, control is performed in such a way that the switch 25 connects the transmission unit 22 to the communication interface 26 at the time of signal transmission, and connects the reception unit 24 to the communication interface 26 at the time of signal reception. At this time, the switch 25 may be set in such a way that in a case where the transmission unit 22 is connected to the communication interface 26 at the time of signal transmission, the reception unit 24 can receive a signal transmitted from the transmission unit 22.

The communication interface 26 includes an antenna that converts a signal transmitted through the switch 25 into radio waves and converts radio waves transmitted from the counterpart terminal 3 into an electric signal in the case of wireless communication. Incidentally, in this wireless communication system 1, wired communication in addition to wireless communication may be performed with the counterpart terminal 3. In a case where wired communication is performed, the communication interface 26 includes a connector or the like that connects a wire cable required in wired communication.

The oscillator 31 operates under the control of the control unit 33, generates an electric signal having an alternating current waveform that has been generated on the basis of time information set in the local device, and supplies the electric signal to the transmission unit 32.

The oscillator 31 may have a function of adjusting a frequency in accordance with control information that has been supplied from the control unit 33. In addition, the oscillator 31 plays the role of providing time information or the like required to measure a phase for a signal received by the reception unit 34.

The transmission unit 32 performs, on a signal supplied from the oscillator 31, superimposition processing, various types of modulation processing, filtering, or the like using an intermediate frequency required for transmission using radio waves.

The control unit 33 plays the role of a central control unit that controls the entirety of the terminal 3, and includes, for example, an MPU. The control unit 33 controls various types of processing required for space-time synchronization, such as measurement of the reception phase described below, a report of the measured reception phase to a counterpart terminal 2, calculation of a time difference or a propagation time between the terminal 2 and the terminal 3, or time synchronization using feedback to a frequency of the oscillator 31.

The reception unit 34 performs various types of demodulation processing, filtering, or the like on a signal that has been received through the communication interface 36 or a signal that has been received from the transmission unit 32 through the switch 35.

The switch 35 switches connection of the transmission unit 32 or the reception unit 34 to the communication interface 36 under the control of the control unit 33. In such a case, control is performed in such a way that the switch 35 connects the transmission unit 32 to the communication interface 36 at the time of signal transmission, and connects the reception unit 34 to the communication interface 36 at the time of signal reception. At this time, the switch 35 may be set in such a way that in a case where the transmission unit 32 is connected to the communication interface 36 at the time of signal transmission, the reception unit 34 can receive a signal transmitted from the transmission unit 32.

The communication interface 36 includes an antenna that converts a signal transmitted through the switch 35 into radio waves and converts radio waves transmitted from the counterpart terminal 2 into an electric signal in the case of wireless communication. In a case where wired communication is performed, the communication interface 36 includes a connector or the like that connects a wire cable required in wired communication.

Next, an operation of the wireless communication system 1 having the configuration described above is described. In the wireless communication system 1, mutual space-time synchronization communication is performed between the terminal 2 and the terminal 3. Space-time synchronization means a state where the terminal 2 and the terminal 3 performs local time synchronization, and grasp a mutual location. Stated another way, space-time synchronization means a state where the terminals 2 and 3 share one clock although the terminals 2 and 3 are separated from each other. In particular, in the present invention, wireless two-way interferometry (Wi-Wi) is used, and the terminals 2 and 3 measure a time difference between the respective oscillators 21 and 31, and propagation times of a signal transmitted from the terminal 2 to the terminal 3 and a signal transmitted from the terminal 3 to the terminal 2 with the precision of a picosecond level. Then, the terminals 2 and 3 perform time synchronization on the basis of a result of measurement. At this time, the terminals 2 and 3 can measure a distance to each other with the precision of a millimeter level on the basis of the time difference or the propagation times that have been measured. By measuring a distance, the displacement of infrastructure including building structures, civil engineering structures, and the like can also be measured at a millimeter level, and application can also be made to visualization of the distribution of vapor on the earth's surface, or the like.

A processing operation in a case where space-time synchronization is performed in the procedure described below.

Figure 2:
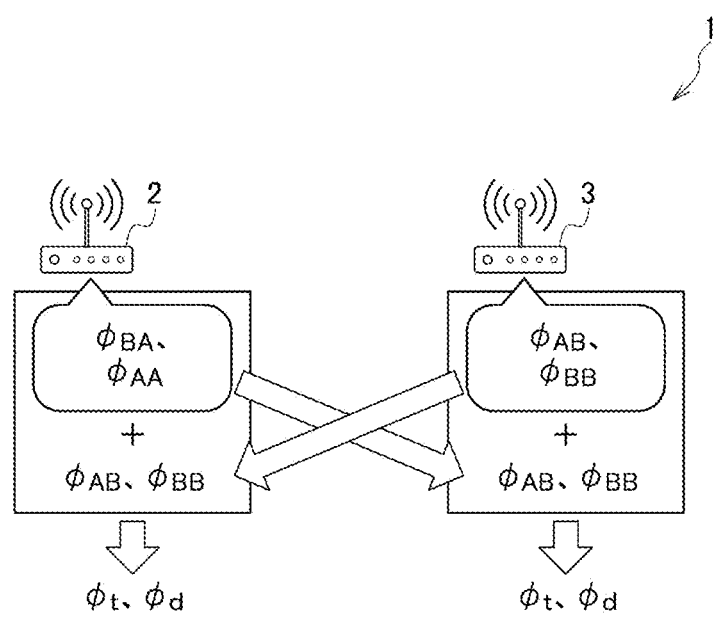
FIG. 2 is a diagram for explaining the type of a reception phase of a signal to be measured in a case where terminals transmit or receive a signal to/from each other.

First, in attempting space-time synchronization, each of the terminals 2 and 3 transmits a signal to a counterpart at least once. Then, each of the terminals 2 and 3 measures a phase of the received signal. In a case where each of the terminals 2 and 3 transmits and receives a signal, a reception phase to be measured of a signal can be classified into four types, as illustrated in FIG. 2. A reception phase of a signal received by the reception unit 24 of the terminal 2 is classified into a reception phase $\varphi_{AA}$ of a signal that the terminal 2 itself has transmitted from the transmission unit 22 and has received in the reception unit 24, and a reception phase $\varphi_{BA}$ of a signal that the transmission unit 32 of the terminal 3 has transmitted. In addition, a reception phase of a signal received by the reception unit 34 of the terminal 3 is classified into a reception phase $\varphi_{BB}$ of a signal that the terminal 3 itself has transmitted from the transmission unit 32 and has received in the reception unit 34, and a reception phase $\varphi_{AB}$ of a signal that the transmission unit 22 of the terminal 2 has transmitted. Note that in a method for expressing a reception phase $\varphi_{xy}$, x indicates a transmission source of a signal, and y indicates a reception destination.

In a case where space-time synchronization is performed, each of the terminals 2 and 3 reports a measured reception phase to a counterpart. Stated another way, the terminal 2 reports, to the terminal 3, the reception phase $\varphi_{AA}$ and the reception phase $\varphi_{BA}$ that the terminal 2 itself has measured, and the terminal 3 reports, to the terminal 2, the reception phase $\varphi_{BB}$ and the reception phase $\varphi_{AB}$ that the terminal 3 itself has measured. As a result, the terminals 2 and 3 enter into a state where the reception phase $\varphi_{AA}$, the reception phase $\varphi_{BA}$, the reception phase $\varphi_{BB}$, and the reception phase $\varphi_{AB}$ have been shared as a reception phase that has been measured by the local device or has been reported from a counterpart.

Next, the terminals 2 and 3 obtain a time difference and a propagation time between the terminals 2 and 3 on the basis of the shared reception phases ($\varphi_{AA}$, $\varphi_{BA}$, $\varphi_{BB}$, and $\varphi_{AB}$) by using Formulae (1) to (4) described below.

$$\varphi_B = \varphi_{AB} - \varphi_{AA} \quad (1)$$

$$\varphi_A = \varphi_{BA} - \varphi_{BB} \quad (2)$$

$$\varphi_{t(AB)} = (\varphi_B - \varphi_A)/2 \quad (3) \text{ Time difference}$$

$$\varphi_{d(AB)} = (\varphi_B + \varphi_A)/2 \quad (4) \text{ Propagation time}$$

Each of the respective reception phases ($\varphi_{AA}$, $\varphi_{BA}$, $\varphi_{BB}$, and $\varphi_{AB}$) originally includes a time difference phase and a propagation time phase between the terminals 2 and 3. Therefore, a time difference and a propagation time between the terminals 2 and 3 can be shared by substituting the shared reception phases ($\varphi_{AA}$, $\varphi_{BA}$, $\varphi_{BB}$, and $\varphi_{AB}$) into the formulae described above.

Describing in more detail, under the assumption that communication is performed at frequency $f_0$, each of the reception phases ($\varphi_{AA}$, $\varphi_{BA}$, $\varphi_{BB}$, and $\varphi_{AB}$) can be expressed by Formulae (5) to (8) described below.

$$\varphi_{AA} = 2\pi f_0(T_{AT} - T_{AR} + t_{dAA}) \bmod 2\pi = \varphi_{AT} - \varphi_{AR} + \varphi_{dAA} \quad (5)$$

$$\varphi_{BA} = 2\pi f_0(T_{BT} - T_{AR} + t_{dBA}) \bmod 2\pi = \varphi_{BT} - \varphi_{AR} + \varphi_{dBA} \quad (6)$$

$$\varphi_{BB} = 2\pi f_0(T_{BT} - T_{BR} + t_{dBB}) \bmod 2\pi = \varphi_{BT} - \varphi_{BR} + \varphi_{dBB} \quad (7)$$

$$\varphi_{AB} = 2\pi f_0(T_{AT} - T_{BR} + t_{dAB}) \bmod 2\pi = \varphi_{AT} - \varphi_{BR} + \varphi_{dAB} \quad (8)$$

Here, it is assumed that the transmission unit 22 and the reception unit 24 use oscillators 21 that are different from each other, and it is also assumed that the transmission unit 32 and the reception unit 34 use oscillators 31 that are different from each other. In this case, $T_{AT}$ is a transmission time of the transmission unit 22, and $\varphi_{AT}$ is a phase of a signal that has been transmitted from the transmission unit 22. $T_{AR}$ is a reception time of the reception unit 24, and $\varphi_{AR}$ is a phase of a signal that has been received by the reception unit 24. $T_{BT}$ is a transmission time of the transmission unit 32, and $\varphi_{BT}$ is a phase of a signal that has been transmitted from the transmission unit 32. $T_{BR}$ is a reception time of the reception unit 34, and $\varphi_{BR}$ is a phase of a signal that has been received by the reception unit 34. In addition, $t_{dxy}$ indicates a propagation time between x and y. In other words, $t_{dAA}$ indicates a propagation time of a signal that has been transmitted from the transmission unit 22 of the terminal 2 and has been received by the reception unit 24, $t_{dBA}$ indicates a propagation time of a signal that has been transmitted from the transmission unit 32 of the terminal 3 and has been received by the reception unit 24 of the terminal 2, $t_{dBB}$ indicates a propagation time of a signal that has been transmitted from the transmission unit 32 of the terminal 3 and has been received by the reception unit 34, and $t_{dAB}$ indicates a propagation time of a signal that has been transmitted from the transmission unit 22 of the terminal 2 and has been received by the reception unit 34 of the terminal 3.

According to the formulae described above, each of the reception phases ($\varphi_{AA}$, $\varphi_{BA}$, $\varphi_{BB}$, and $\varphi_{AB}$) is expressed as a value obtained by adding a propagation time to a difference between a phase in the transmission unit 22 or 32 serving as a signal transmission source and a phase in the reception unit 24 or 34 serving as a signal reception unit, as expressed in right-hand sides of Formulae (5) to (8).

By substituting the right-hand sides of Formulae (5) to (8) into Formulae (1) to (4) described above, Formulae (1)' to (4)' rewritten as described below can be obtained.

$$\varphi_B = \varphi_{AB} - \varphi_{AA} = \varphi_{AT} - \varphi_{BR} + \varphi_{dAB} - \varphi_{AT} + \varphi_{AR} - \varphi_{dAA} = \varphi_{AR} - \varphi_{BR} + \varphi_{dAB} - \varphi_{dAA} \quad (1)'$$

$$\varphi_A = \varphi_{BA} - \varphi_{BB} = \varphi_{BT} - \varphi_{AR} + \varphi_{dBA} - \varphi_{BT} + \varphi_{BR} - \varphi_{dBB} = \varphi_{BR} - \varphi_{AR} + \varphi_{dBA} - \varphi_{dBB} \quad (2)'$$

$$\varphi_{t(AB)} = \varphi_{AR} - \varphi_{BR} + (\varphi_{dBB} - \varphi_{dAA})/2 \quad (3)' \text{ Time difference}$$

$$\varphi_{d(AB)} = \varphi_{dAB} + (-\varphi_{dBB} - \varphi_{dAA})/2 \quad (4)' \text{ Propagation time}$$

Note that it is assumed that $\varphi_{dAB} = \varphi_{dBA}$. In addition, if there is no individual difference between the terminals 2 and 3, $\varphi_{dBB} = \varphi_{dAA}$ is established. Therefore, in (3)', ($\varphi_{dBB} - \varphi_{dAA})/2 = 0$ is established. Further, in (4)', $\varphi_{dBB} + \varphi_{dAA}$ has a fixed value, and may be ignored in the discussion of the present invention.

The wireless communication system 1 to which the present invention has been applied further performs the processing operation described below, in performing wireless communication using Wi-Wi, as described above.

Figure 3:
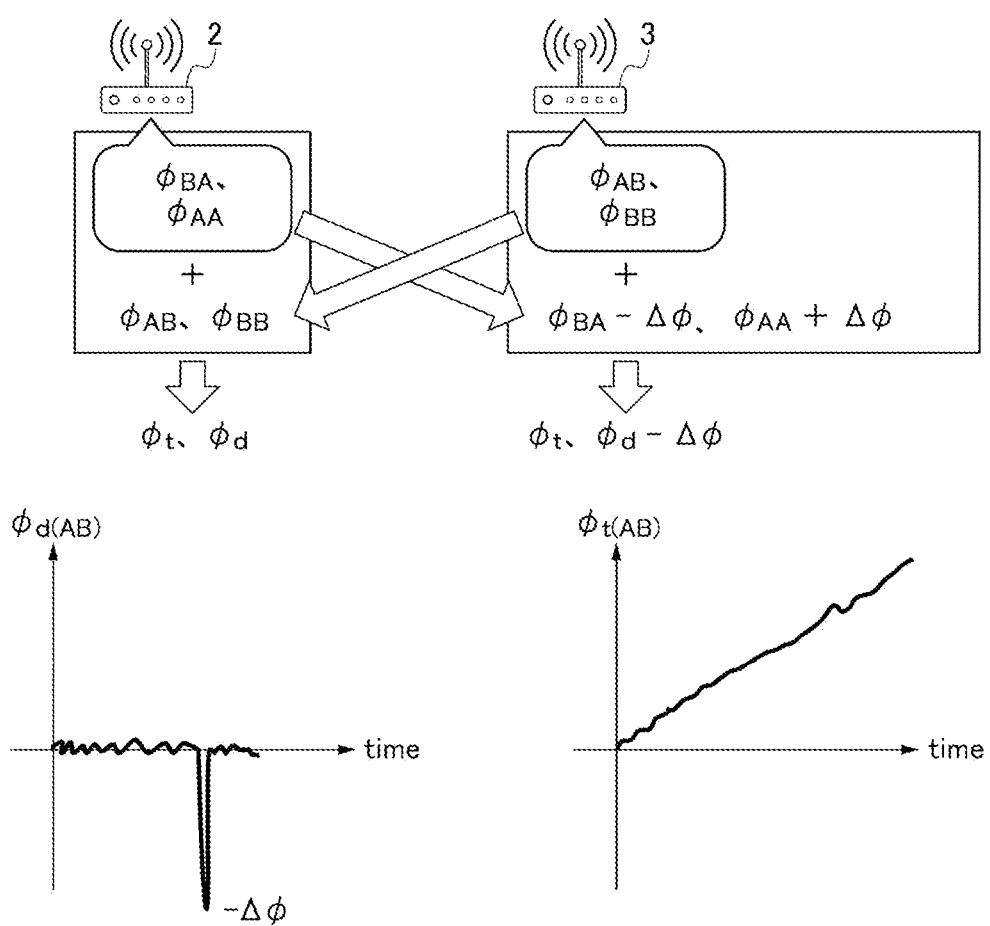
FIG. 3 is a diagram illustrating an example where one terminal adds $+\Delta\varphi$ to a reception phase $\varphi_{AA}$ that the terminal itself has measured, and adds $-\Delta\varphi$ to a reception phase $\varphi_{BA}$.

As illustrated in FIG. 3, in attempting space-time synchronization, each of the terminals 2 and 3 transmits a signal to a counterpart, and measures a phase of a received signal, similarly to the description above. Next, the terminal 2 adds $+\Delta\varphi$ to a reception phase $\varphi_{AA}$ that the terminal 2 itself has measured, adds $-\Delta\varphi$ to a reception phase $\varphi_{BA}$, and makes a report to the terminal 3. The terminal 3 reports, to the terminal 2, a reception phase $\varphi_{BB}$ and a reception phase $\varphi_{AB}$ that the terminal 3 itself has measured, similarly to the description above. As a result, the terminal 2 enters into a state where the reception phase $\varphi_{AA}$, the reception phase $\varphi_{BA}$, the reception phase $\varphi_{BB}$, and the reception phase $\varphi_{AB}$ have been obtained as a reception phase that has been measured by the local device or has been reported from a counterpart. On the other hand, the terminal 3 enters into a state where a reception phase $\varphi_{AA} + \Delta\varphi$, a reception phase $\varphi_{BA} - \Delta\varphi$, the reception phase $\varphi_{BB}$, and the reception phase $\varphi_{AB}$ have been obtained as a reception phase that has been measured by the local device or has been reported from a counterpart.

Next, the terminals 2 and 3 obtain a time difference and a propagation time between the terminals 2 and 3 on the basis of the shared reception phases. Reception phases obtained by the terminal 2 are the reception phases $\varphi_{AA}$, $\varphi_{BA}$, $\varphi_{BB}$, and $\varphi_{AB}$, similarly to the description above. Therefore, $\varphi_B$, $\varphi_A$, $\varphi_{t(AB)}$, and $\varphi_{d(AB)}$ to be obtained are similar to $\varphi_B$, $\varphi_A$, $\varphi_{t(AB)}$, and $\varphi_{d(AB)}$ in Formulae (1) to (4) described above. In time-series changes in the time difference $\varphi t_{(AB)}$ and the propagation time $\varphi_{d(AB)}$ that have been obtained by the terminal 2, only a monotonous change is made according to a result of calculation according to Formulae (3) and (4), as illustrated in FIG. 3.

In contrast, reception phases obtained by the terminal 3 are $\varphi_{AA} + \Delta\varphi$, $\varphi_{BA} - \Delta\varphi$, $\varphi_{BB}$, and $\varphi_{AB}$). Therefore, ($\varphi_B$, $\varphi_A$, $\varphi_{t(AB)}$, and $\varphi_{d(AB)}$ to be obtained are expressed as (9) to (12) described below.

$$\varphi_B = \varphi_{AB} - \varphi_{AA} - \Delta\varphi \quad (9)$$

$$\varphi_A = \varphi_{BA} - \varphi_{BB} - \Delta\varphi \quad (10)$$

$$\varphi_{t(AB)} = (\varphi_B - \varphi_A)/2 \quad (11) \text{ Time difference}$$

$$\varphi_{d(AB)} = (\varphi_B + \varphi_A)/2 - \Delta\varphi \quad (12) \text{ Propagation time}$$

In a time-series change in the time difference $\varphi_{t(AB)}$ obtained by the terminal 3, only a monotonous change is made according to a result of calculation according to Formula (11). On the other hand, in Formula (12), $-\Delta\varphi$ has been newly added to a propagation time obtained by the terminal 3. Therefore, in a time-series change in the propagation time, a change is made at a timing when $\Delta\varphi$ is added, as illustrated in FIG. 3. A change in a propagation time due to addition of $\Delta\varphi$ is overwhelmingly large in comparison with noise generated in a time-series change in the propagation time. Therefore, a side of the terminal 3 can detect this change in the propagation time. Stated another way, in a case where some information has been superimposed onto a change in the propagation time, a side of the terminal 3 detects the change in the propagation time so that superimposed information can be read.

Therefore, every several times, the terminal 2 adds $\Delta\varphi$ to the reception phase $\varphi_{AA}$ and adds $-\Delta\varphi$ to the reception phase $\varphi_{BA}$, as described above, and makes a report. By doing this, data bits that can be transmitted can be increased by one digit. In such a case, bit information of 0 or 1 can be indicated according to whether $\Delta\varphi$ has been added, or bit information of 0 or 1 may be indicated by changing the magnitude of $\Delta\varphi$. Alternatively, information may be added to $\Delta\varphi$ itself.

In particular, in this example of FIG. 3, in the case of a small change in radio wave propagation environment, information can be superimposed onto the propagation time. According to this method, information having a larger amount by one bit can be transmitted without using an additional radio wave transmission time or radio wave resource (frequency band).

In the embodiment described above, description has been provided by using, as an example, a case where information having a larger amount by one bit is transmitted from a side of the terminal 2 to the terminal 3. In contrast, information having a larger amount by one bit may be transmitted from the terminal 3 to the terminal 2. In such a case, the terminal 3 adds a positive or negative phase (p to a measured reception phase, and makes a report to the terminal 2. This similarly enables the side of the terminal 2 to receive information that corresponds to $\Delta\varphi$. In addition, similarly, both may simultaneously transmit information having a larger amount by one bit. In such a case, both add a positive or negative phase Op to a measured reception phase, and make a report to a counterpart. In calculating a propagation time, both can read superimposed information by using a phase value that the local device has measured.

In addition, in the embodiment described above, description has been provided by using, as an example, a case where a propagation time includes a message including an extra one bit. However, this is not restrictive, and a message including an extra one bit may be transmitted for a time difference, or each of the propagation time and the time difference may include a message including an extra one bit.

Figure 4:
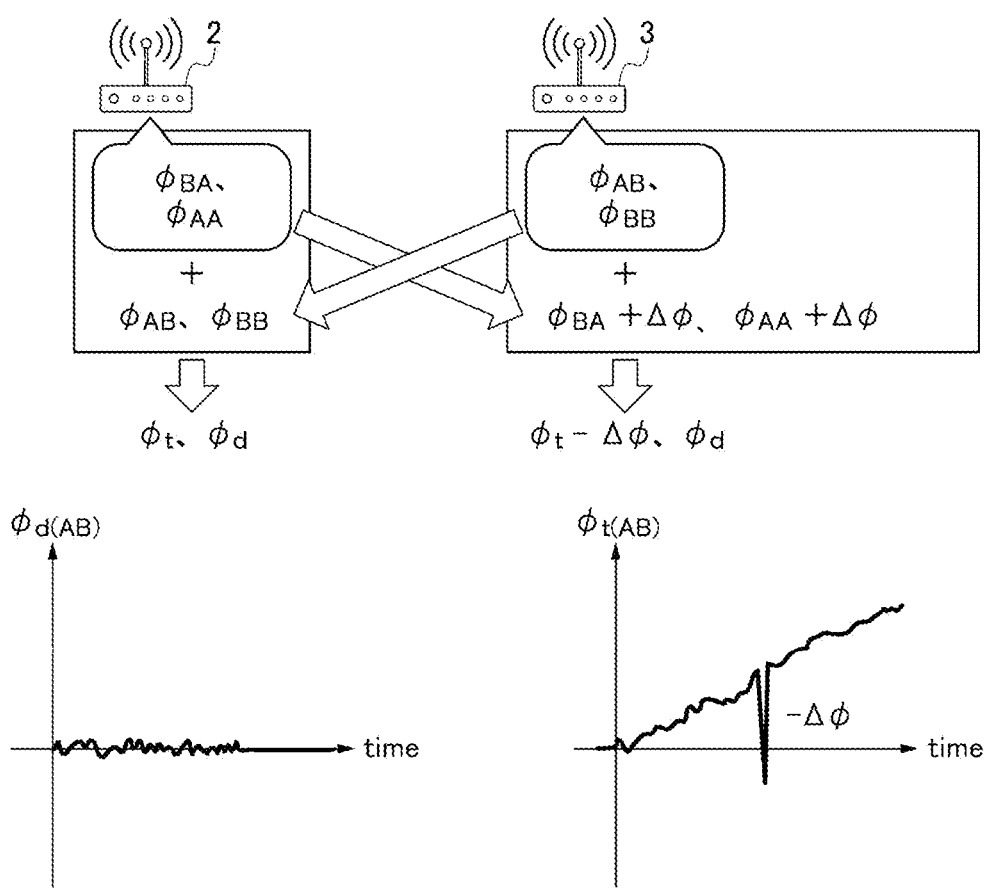
FIG. 4 is a diagram illustrating an example where one terminal adds $+\Delta\varphi$ to a reception phase $\varphi_{AA}$ that the terminal itself has measured, and adds $+\Delta\varphi$ to a reception phase $\varphi_{BA}$.

In a case where a message including an extra one bit is transmitted for a time difference, the terminal 2 adds $+\Delta\varphi$ to a reception phase $\varphi_{AA}$ that the terminal 2 itself has measured, adds $+\Delta\varphi$ to a reception phase $\varphi_{BA}$, and makes a report to the terminal 3, as illustrated in FIG. 4. The terminal 3 reports, to the terminal 2, a reception phase $\varphi_{BB}$ and a reception phase $\varphi_{AB}$ that the terminal 3 itself has measured, similarly to the description above. As a result, the terminal 3 enters into a state where a reception phase $\varphi_{AA}+\Delta\varphi$, a reception phase $\varphi_{AB}+\Delta\varphi$, the reception phase $\varphi_{BB}$, and the reception phase $\varphi_{AB}$ have been obtained as a reception phase that has been measured by the local device or has been reported from a counterpart. When these respective reception phases are substituted into Formulae (1) to (4), a time difference $\varphi_{t(AB)}$ is $(\varphi_B-\varphi_A)/2-\Delta\varphi$, and a propagation time is calculated in such a way that $\varphi_{d(AB)}=(\varphi_B+\varphi_A)/2$. Stated another way, $-\Delta\varphi$ can only be added to a time difference.

$-\Delta\varphi$ has been newly added to a time difference $\varphi_{t(AB)}$ obtained by the terminal 3. Therefore, as illustrated in FIG. 4, in a time-series change in the time difference $\varphi_{t(AB)}$, a change is made at a timing when $\Delta\varphi$ is added. In contrast, there is no time-series change in a propagation time. At this time, the terminal 3 may provide feedback to the oscillator 31 to perform time synchronization, and may reduce a time-series phase variation in a time difference.

Figure 5:
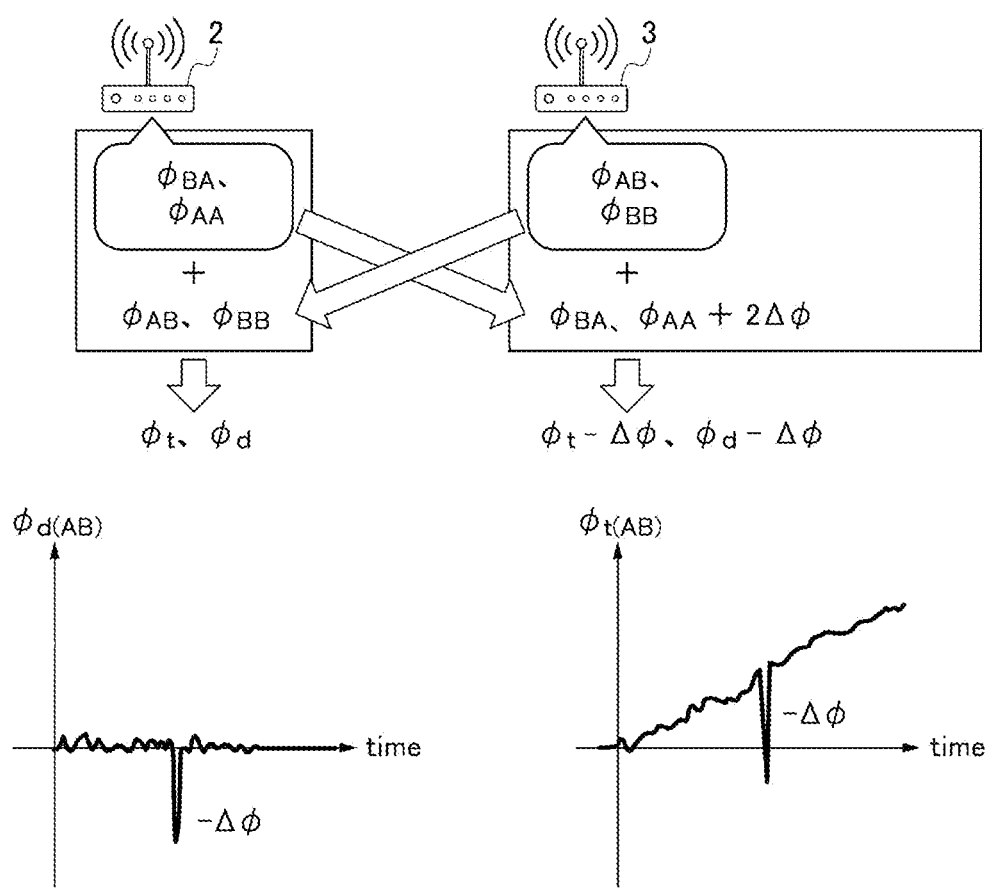
FIG. 5 is a diagram illustrating an example where one terminal adds $+2\Delta\varphi$ to a reception phase $\varphi_{AA}$ that the terminal itself has measured.

In a case where a message including an extra one bit is transmitted for both a time difference and a propagation time, the terminal 2 adds $+2\Delta\varphi$ to a reception phase $\varphi_{AA}$ that the terminal 2 itself has measured, and makes a report to the terminal 3, as illustrated in FIG. 5. The terminal 3 reports, to the terminal 2, a reception phase $\varphi_{BB}$ and a reception phase $\varphi_{AB}$ that the terminal 3 itself has measured, similarly to the description above. As a result, the terminal 3 enters into a state where a reception phase $\varphi A+2\Delta\varphi$, a reception phase $\varphi_{BA}$, the reception phase $\varphi_{BB}$, and the reception phase $\varphi_{AB}$ have been obtained as a reception phase that has been measured by the local device or has been reported from a counterpart. When these respective reception phases are substituted into Formulae (1) to (4), a time difference $\varphi_{t(AB)}$ is $(\varphi_B-\varphi_A)/2-\Delta\varphi$, and a propagation time is calculated in such a way that $\varphi_{d(AB)}=(\varphi_B+\varphi_A)/2-\Delta\varphi$. Stated another way, $-\Delta\varphi$ can be added to both a propagation time and a time difference. Incidentally, $+2\Delta\varphi$ to be added to the reception phase $\varphi_{AA}$ may be an arbitrary value.

$-\Delta\varphi$ has been added to each of a propagation time $\varphi_{d(AB)}$ and a time difference $\varphi_{t(AB)}$ to be obtained by the terminal 3. Therefore, as illustrated in FIG. 5, in time-series changes in the propagation time $\varphi_{d(AB)}$ and the time difference $\varphi_{t(AB)}$, a change is made at a timing when $\Delta\varphi$ is added.

Figure 6:
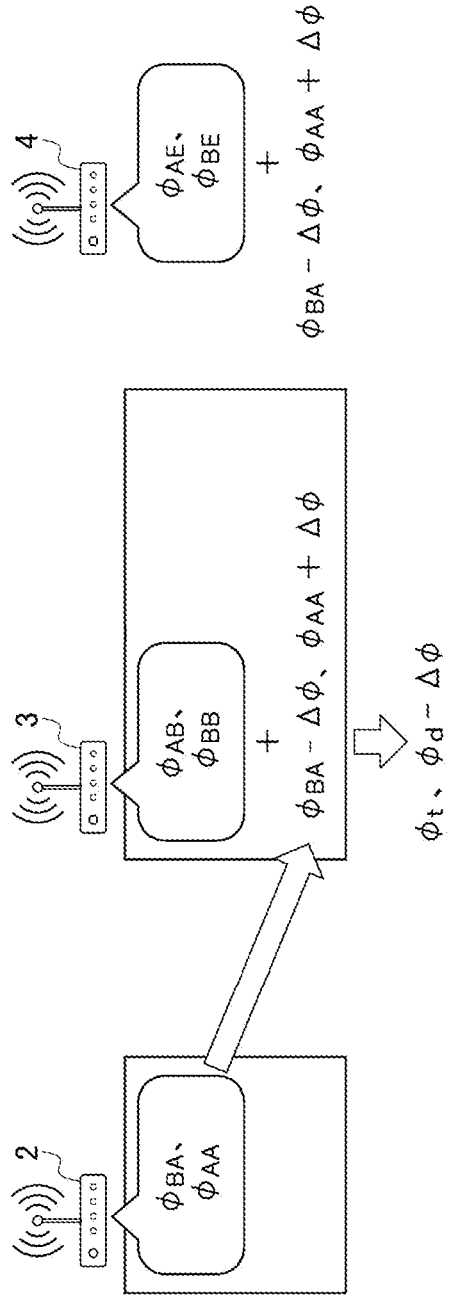
FIG. 6 is a diagram illustrating an example where one terminal reports a reception phase to another terminal, and a report of a reception phase from the other terminal to the one terminal is omitted, and therefore secret communication is achieved.

Extra one-bit information that corresponds to $\Delta\varphi$, as described above, can be transmitted from the terminal 2 to the terminal 3, at least if the reception phases described above are reported from the terminal 2 to the terminal 3, as illustrated in FIG. 6. A report of reception phases from the terminal 3 to the terminal 2 may be omitted. By using such a method, the secret communication described below can be achieved.

In the embodiment described above, in a case where a propagation time includes a message including an extra one bit, $(\varphi_B-\varphi_A)/2$ and $(\varphi_B+\varphi_A)/2-\Delta\varphi$ can be obtained as $\varphi_{t(AB)}$ and $\varphi_{d(AB)}$, respectively on the basis of the reception phases $(\varphi_{AA}+\Delta\varphi, \varphi_{BA}-\Delta\varphi, \varphi_{BB}$, and $\varphi_{AB})$ that have been obtained by the terminal 3. If this is indicated in time series, a propagation time that corresponds to $-\Delta\varphi$ can be obtained at a timing when $\Delta\varphi$ is added, as illustrated in FIGS. 3 to 5. In a case where some information has been superimposed onto a change in the propagation time that corresponds to $\Delta\varphi$, a side of the terminal 3 can read the superimposed information by detecting the change in the propagation time.

In a case where an attempt is made to maintain, only between the terminal 2 and the terminal 3, the secrecy of information that has been superimposed onto the propagation time that corresponds to $\Delta\varphi$, it is assumed that there is a terminal 4 serving as a third party that desires to intercept this information. In such a case, this secret communication is performed, and therefore the terminal 4 can intercept a reception phase $\varphi_{AE}$ that has been transmitted from the terminal 2 and has been received by the terminal 4 and a reception phase $\varphi_{BE}$ that has been transmitted from the terminal 2 and has been received by the terminal 4, as illustrated in FIG. 6. In addition, reception phases $(\varphi_{AA}+\Delta\varphi$ and $\varphi_{BA}-\Delta\varphi)$ that have been reported from the terminal 2 and the terminal 3 can be intercepted. However, the reception phases $(\varphi_{AA}+\Delta\varphi, \varphi_{BA}-\Delta\varphi, \varphi_{AE}$, and $\varphi_{BE})$ that have been obtained on a side of the terminal 4 are insufficient information to reproduce a change in a propagation time. Stated another way, reception phases ($\varphi_{BB}$ and $\varphi_{AB}$) that have been obtained by the reception unit 34 of the terminal 3 are kept a secret in the terminal 3, and these reception phases are not reported to the terminal 2. Therefore, the terminal 4 fails to intercept these reception phases ($\varphi_{BB}$ and $\varphi_{AB}$). Therefore, when the terminal 4 forcefully makes an attempt to obtain a propagation time on the basis of the obtained reception phases ($\varphi_{AA}+\Delta\varphi$, $\varphi_{BA}-\Delta\varphi$, $\varphi_{AE}$, and $\varphi_{BE}$), an SN ratio deteriorates even if a change in the propagation time that corresponds to $\Delta\varphi$ is included, and therefore the change fails to be detected.

In such a mechanism, information that has been superimposed onto a propagation time that corresponds to Op can be kept a secret only between the terminal 2 and the terminal 3, and can be prevented from being intercepted by the terminal 4 serving as a third party. Therefore, it can be said that this mechanism exhibits a satisfactory effect to wirelessly communicate information requiring very high security. In the embodiment described above of secret communication, description has been provided by using, as an example, a case where a change that corresponds to $\Delta\varphi$ is reflected in a propagation time. In addition to this case, a case where a change that corresponds to $\Delta\varphi$ is reflected in a time difference or a case where a change that corresponds to $\Delta\varphi$ is reflected in both the propagation time and the time difference can be achieved similarly.

In a case where such secret communication is performed, first, prior adjustment is performed in the terminals 2 and 3. In this prior adjustment, the terminals 2 and 3 mutually confirm that secret communication will be performed. Then, information relating to a channel, a value of $\Delta\varphi$, a data length, or the like in secret communication is received/transmitted in advance, and is shared. Further, whether a change that corresponds to $\Delta\varphi$ will be reflected in any of a propagation time and a time difference or both the propagation time and the time difference is shared in advance in addition to a communication environment. Then, the secret communication described above is performed from the terminal 2 to the terminal 3. The terminal 3 obtains data that has been superimposed onto the obtained $\Delta\varphi$, and performs processing such as error correction.

Figure 7:
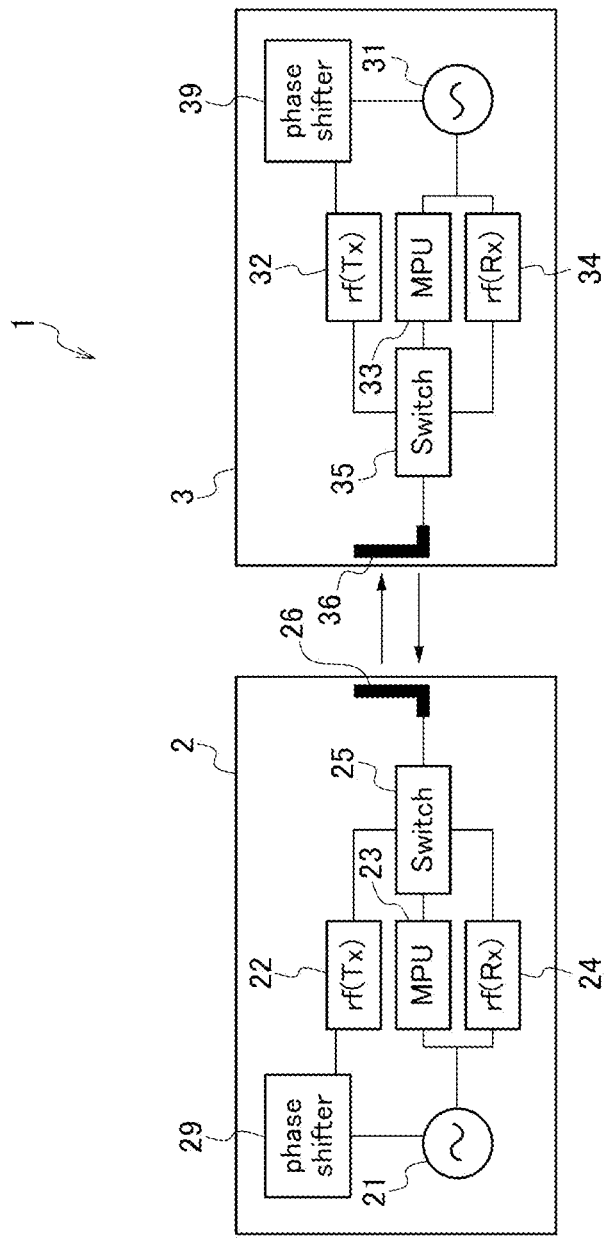
FIG. 7 is a block configuration diagram in a case where an oscillator is caused to change a phase at random.

As another method for performing secret communication, the terminals 2 and 3 may transmit a signal obtained by causing the internally mounted oscillators 21 and 31 to change a phase at random or by a predetermined amount. FIG. 7 illustrates a block configuration in a case where the oscillators 21 and 31 are caused to change a phase at random. In the terminal 2, a phase shifter 29 is provided between the oscillator 21 and the transmission unit 22.

The phase shifter 29 may be located between the transmission unit 22 and the switch 25. In the terminal 3, a phase shifter 39 is provided between the oscillator 31 and the transmission unit 32. The phase shifter 39 may be located between the transmission unit 32 and the switch 35. The phase shifters 29 and 39 have a function of changing a phase of a supplied signal by a predetermined amount or at random and outputting the signal. If the phase shifter 29 and 39 have changed a phase at random, each of the transmission unit 22 and the transmission unit 32 can obtain a signal for which a phase has been changed at random, and can transmit the signal to a counterpart. It is desirable that shift amounts by which the phase shifters 29 and 39 respectively change a phase at random be different from each other.

In a process in which the terminal 3 receives information included in $\Delta\varphi$ that has been transmitted from the terminal 2, the processing operation described below may be performed in order to prevent the information from being deciphered by the terminal 4 serving as a third party.

If a phase for transmission from the terminal 3 matches or is correlated to a phase for reception of the terminal 3, a reception phase of the terminal 3 is guessed by using, as a clue, the phase for transmission from the terminal 3. In order to avoid such a case, each of the phase shifters 29 and 39 changes a phase at random in such a way that a transmission phase of the terminal 3 does not match a reception phase of the terminal 3. In a case where an attempt is made to maintain, only between the terminal 2 and the terminal 3, the secrecy of information that has been superimposed onto a propagation time that corresponds to $\Delta\varphi$, it is sufficient if the phase shifter 39 is provided on a side of the terminal 3. By only changing a reception phase at random, the effect described above is exhibited.

Figure 8:
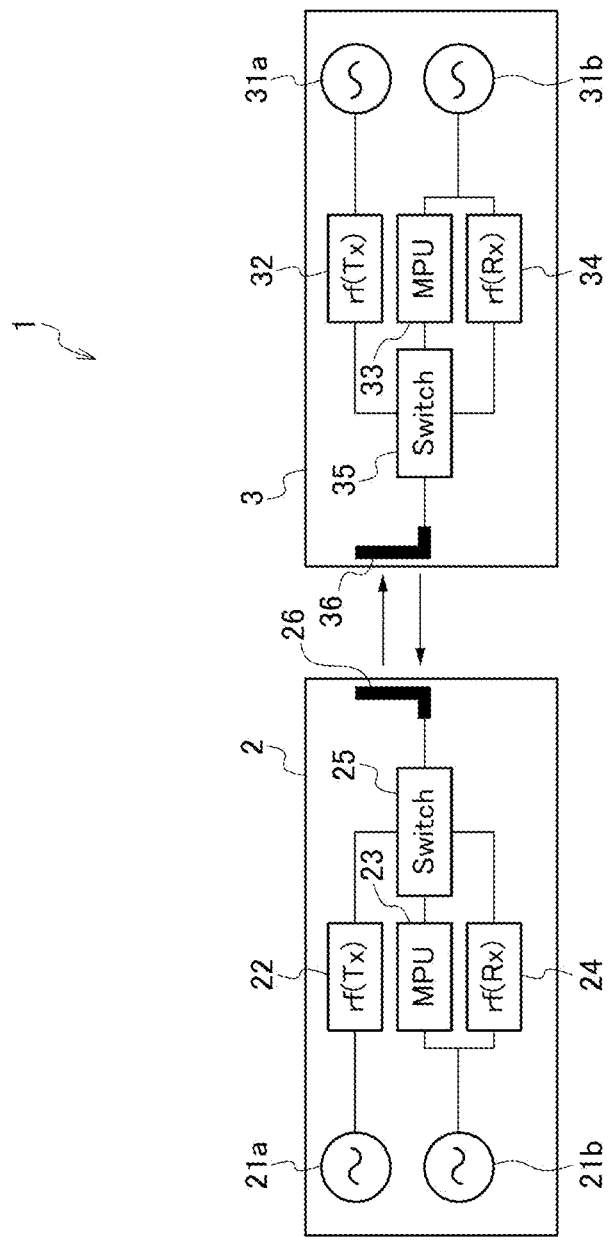
FIG. 8 is a block configuration diagram in a case where an oscillator is independently provided on sides of a transmission unit and a reception unit instead of providing a phase shifter.

As illustrated in FIG. 8, the oscillator 21 or 31 may be independently provided on a side of the transmission unit 22 or 32 and on a side of the reception unit 24 or 34, instead of providing the phase shifters 29 and 39. Stated another way, on a side of the terminal 2, an oscillator 21a that is only connected to the transmission unit 22 and an oscillator 21b that is only connected to the control unit 23 and the reception unit 24 are provided. In addition, on a side of the terminal 3, an oscillator 31a that is only connected to the transmission unit 32 and an oscillator 31b that is only connected to the control unit 33 and the reception unit 34 are provided. Then, the oscillators 21b and 31b are caused to change phases of signals that have been transmitted from the oscillators 21a and 31a, at random or by a predetermined amount. By doing this, each of the transmission units 22 and 32 can obtain a signal for which a phase has been changed, and can transmit the signal to a counterpart. As a result, an effect that is similar to an effect in a case where the phase shifters 29 and 39 are provided can be exhibited.

Incidentally, in a case where the secret communication illustrated in FIG. 6 is also performed when the secret communication illustrated in FIG. 7 or 8 is performed, a configuration of the phase shifter 29 or the oscillators 21a and 21b that are provided on a side of the terminal 2 may be omitted.

Figure 9:
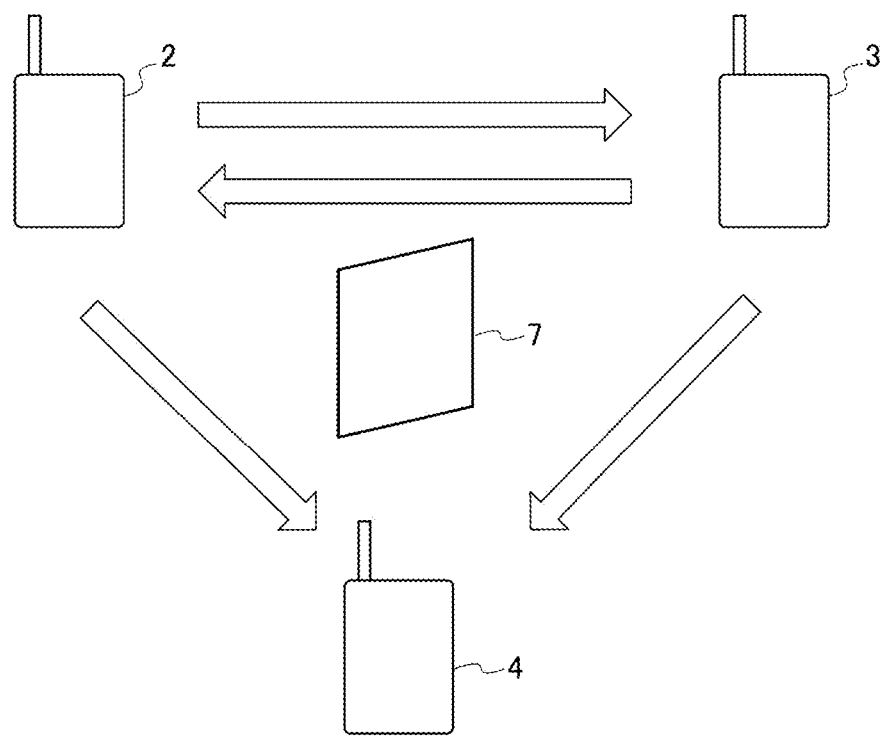
FIG. 9 is a diagram illustrating an example where a noise addition unit that adds noise to each signal transmitted from a terminal is further included.

As another method for performing secret communication, a noise addition unit 7 that adds noise to each signal transmitted from the terminal 2 or 3 may be further included, as illustrated in FIG. 9. The noise addition unit 7 is a device that intentionally adds noise to a propagation time or the like, and includes, for example, a reflector, a rotation mechanism that rotates the reflector, or the like. Such a noise addition unit 7 is placed in a space where the terminal 4 that makes an attempt to intercept communication has been provided in addition to the terminals 2 and 3. Then, the reflector in the noise addition unit 7 is rotated. As a result, noise that has been added to a propagation time between the terminal 2 and the terminal 3 is different from signals that have been intercepted by the terminal 4 serving as a third party, that is, noise that has been added to a propagation time between the terminal 2 and the terminal 4 and noise that has been added to a propagation time between the terminal 3 and the terminal 4. Stated another way, a propagation environment is intentionally disturbed, and this can make it more difficult for a side of the terminal 4 to predict a propagation time. At this time, in such a propagation environment, an amount of noise may be changed in time series, or a timing of adding noise may also be changed in time series.

Stated another way, in order to decipher a signal based on added $\Delta\varphi$, the terminal 4 serving as an interception side needs to correctly extract a time difference or a propagation time from reception phases ($\varphi_{AA}+\Delta\varphi$, $\varphi_{BA}-\Delta\varphi$, $\varphi_{AE}$, and $\varphi_{BE}$) of the terminal 4. The terminal 3 does not publish a measurement value, and therefore the terminal 4 uses $\varphi_{AE}$ instead of PAB, and uses $\varphi_{BE}$ instead of $\varphi_{BB}$. At this time, different noise is added to a difference between PAB and $\varphi_{AE}$ and a difference between $\varphi_{BB}$ and $\varphi_{BE}$, and therefore in the terminal 4, noise is added to calculation values of a time difference and a propagation time. This makes it difficult to extract $\Delta\varphi$. The noise addition unit 7 described above intentionally increases noise, and therefore in the terminal 4, more noise is added to calculation values of a time difference and a propagation time. This enables a reduction in a probability of the terminal 4 intercepting communication.

As a configuration of the noise addition unit 7, any method may be substituted for the method described above if noise can be added to each signal transmitted from the terminal 2 or 3. For example, in a case where the communication interfaces 26 and 36 include an antenna, needless to say, a capacitance may be mounted in the antenna, and a resistance value of the capacitance may be changed at random or by a predetermined amount, by using a well-known technology.

Figure 10:
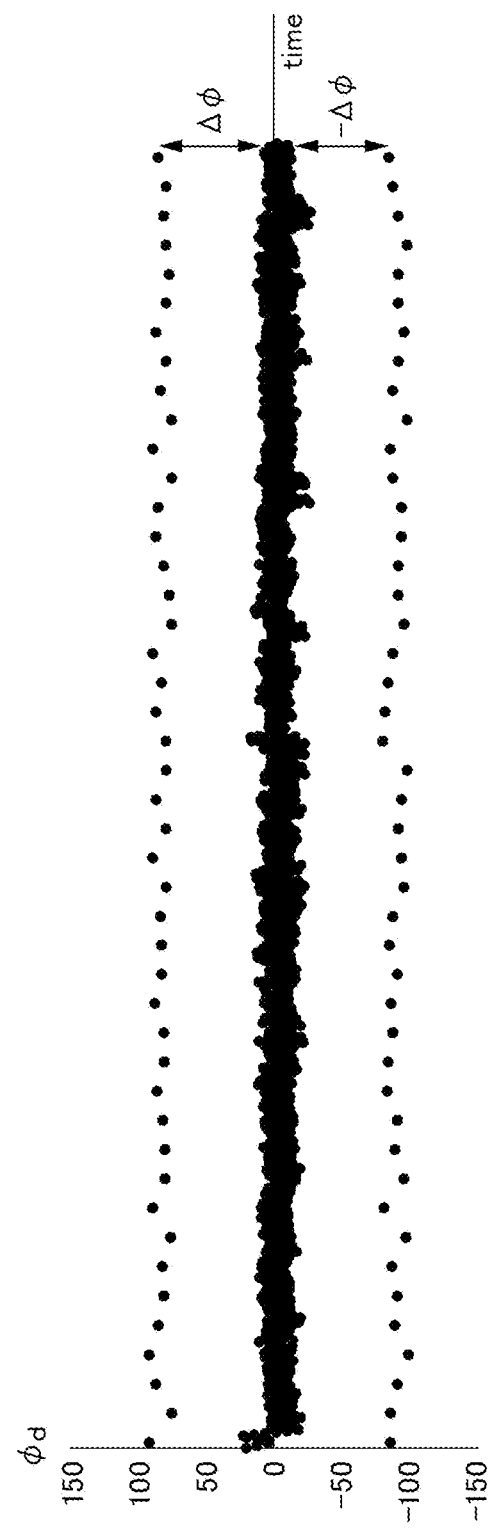
FIG. 10 is a diagram illustrating an example of indicating digital data by using a positive or negative sign of Op to be added as a phase.

According to the present invention, as illustrated in FIG. 10, digital data may be expressed by using a positive or negative sign of $\Delta\varphi$ to be added as a phase. In other words, 1 in a bit string of a codeword is assigned as $+\Delta\varphi$, and 0 in the bit string of the codeword is assigned as $-\Delta\varphi$. By doing this, the bit string can be detected by detecting $\Delta\varphi$. Therefore, in addition to a non-modulation time, a data group including $\pm\Delta\varphi$ can be separately generated.

In the present invention, an encoded codeword can be mapped to $\Delta\varphi$, and can be transmitted. In a case where a codeword is transmitted from the terminal 2 to the terminal 3, the transmission unit 22 described above performs an operation to encode a message to be transmitted to the terminal 3 on the basis of an encoding parameter (an encoding rate or the like), and determine $\Delta\varphi$.

Figure 11:
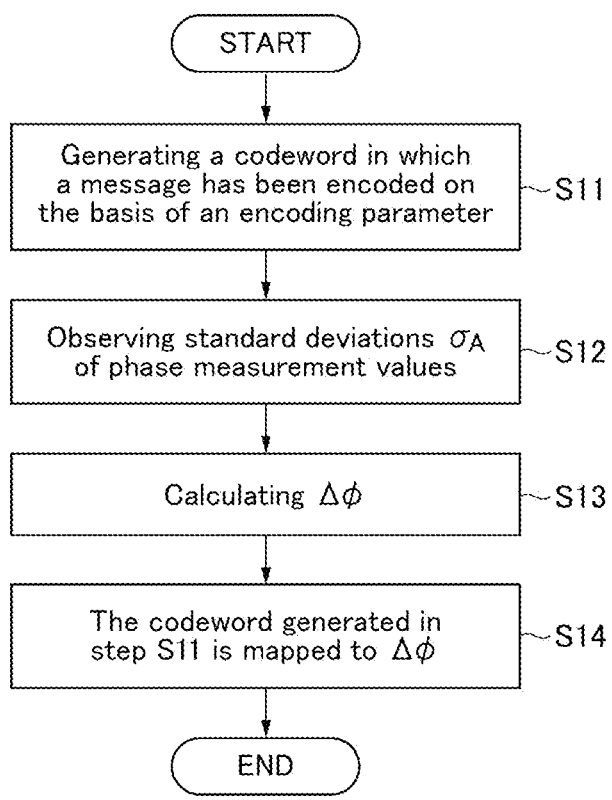
FIG. 11 is a flowchart of mapping a codeword to $\Delta\varphi$ and performing transmission.

The operation is described in detail. As illustrated in FIG. 11, first, in step S11, the transmission unit 22 generates a codeword in which a message has been encoded on the basis of an encoding parameter. The encoding described above may be performed according to any well-known method.

Next, the processing moves on to step S12. The transmission unit 22 observes standard deviations $\sigma_A$ of phase measurement values of a time difference phase $\varphi_{t(AB)}$ and/or a propagation time phase $\varphi_{dAB}$ in a steady state where the terminal 2 is not performing secret communication in a case where communication is performed according to Wi-Wi.

Figure 12:
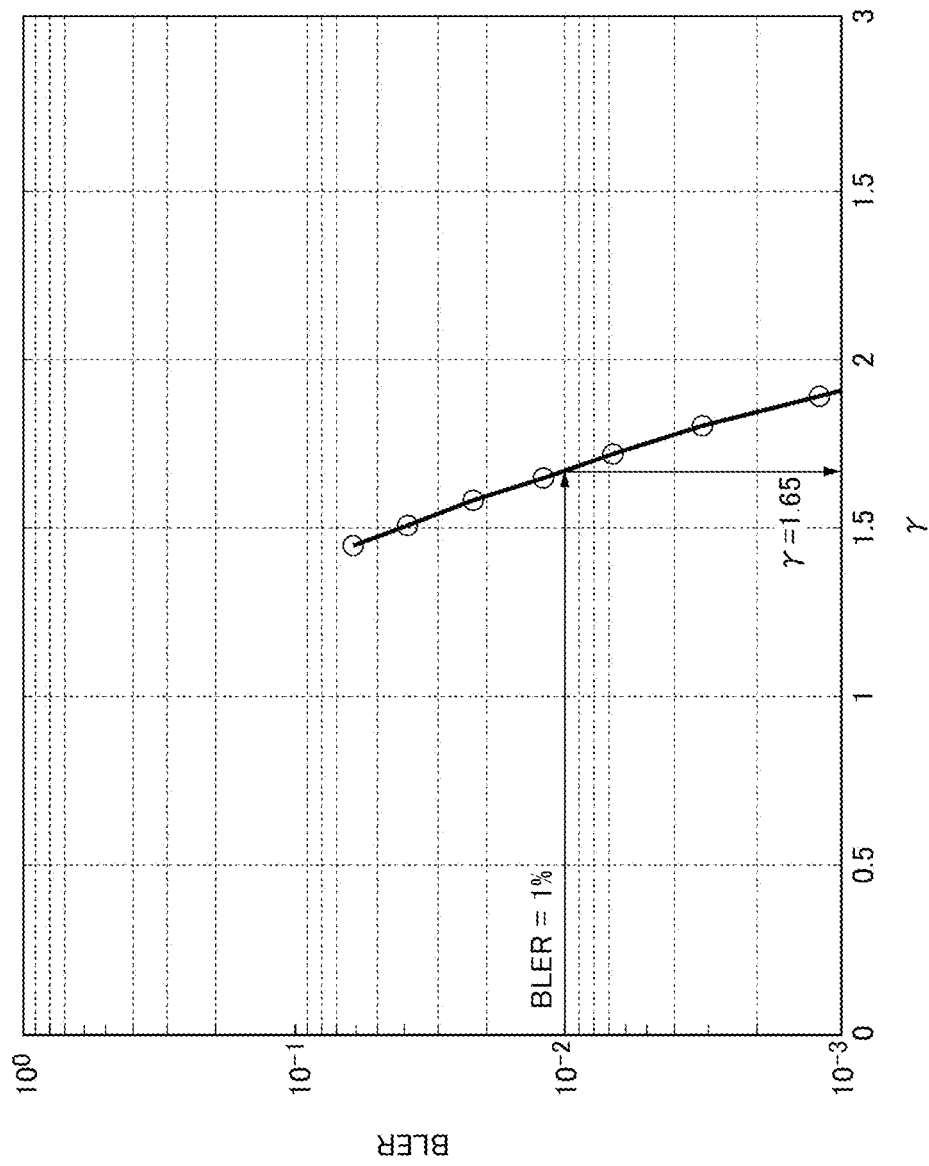
FIG. 12 is a diagram for explaining a method for calculating $\Delta\varphi$.

Next, the processing moves on to step S13. $\Delta\varphi$ is calculated according to an encoding scheme (an encoding parameter) by using Formula $\Delta\varphi=\sqrt{\Delta}\times\sigma_A$. Here, $\gamma$ is a value that is determined on the basis of a desired error rate in transmission of a message between the terminals 2 and 3. FIG. 12 illustrates a characteristic of a $\gamma$-block error rate (BLER) for a polar code (L=12). Here, if a desired BLER is 1%, $\gamma$ is 1.65 according to FIG. 12. If a standard deviation $\sigma_A$ of a phase measurement value of the terminal 2 is 3.12 [deg], $\Delta\varphi$ is calculated in such a way that $\sqrt{1.65\times3.12}=4.0$ [deg].

As described above, in step S13, an appropriate $\Delta\varphi$ is calculated, and the processing moves on to step S14. In step S14, the codeword generated in step S11 is mapped to $\Delta\varphi$. In such a case, for example, 1 in a bit string of the codeword is mapped to $+\Delta\varphi$, and 0 in the bit string of the codeword is mapped to $-\Delta\varphi$. As a result, as illustrated in FIG. 10, a data group including $\pm\Delta\varphi$ can be separately generated. In the data group, 1 in the bit string of the codeword has been assigned as $+\Delta\varphi$, and 0 in the bit string of the codeword has been assigned as $-\Delta\varphi$.

Figure 13:
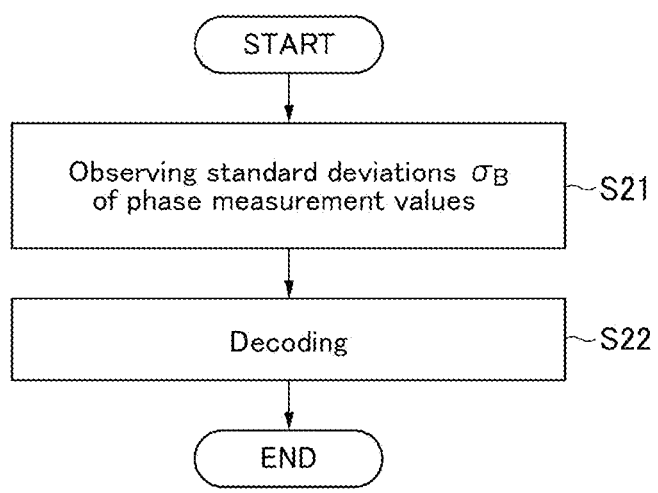
FIG. 13 is another flowchart of mapping a codeword to OA and performing transmission.

FIG. 13 illustrates an operation flow on a side of the terminal 3 that receives a signal that has been generated by mapping such an encoded codeword to $\Delta\varphi$, and has been transmitted. First, in step S21, the terminal 3 observes standard deviations $\sigma_B$ of phase measurement values of a time difference phase $\varphi_{t(AB)}$ and/or a propagation time phase $\varphi_{dAB}$ in a steady state where a side of the terminal 3 is not performing secret communication in performing Wi-Wi communication. Next, the processing moves on to step S22. A string of the phase measurement value is used as a reception codeword string, and the received signal is decoded according to an encoding scheme (an encoding parameter), by using the standard deviation $\sigma_B$ that has been observed in step S21. This standard deviation $\sigma_B$ is used to calculate the likelihood of each bit of a codeword being $+\Delta\varphi$ or $-\Delta\varphi$. A logarithmic likelihood ratio that corresponds to a bit string of the codeword is calculated on the basis of the obtained likelihood, and this logarithmic likelihood ratio is decoded. Therefore, a side of the terminal 3 can decipher a data group including $\pm\Delta\varphi$.

An error is necessarily generated in communication. Therefore, a success rate of communication can be increased by using the error correcting codes described above. Here, a communication parameter and an encoding parameter are adjusted, and therefore conditions for a BLER are selected in such a way that the terminal 3 can receive a signal transmitted from the terminal 2, and can decipher a message, but the terminal 4 having more noise than the terminal 3 fails to decipher the message. Then, $\Delta\varphi$ that corresponds to the selected conditions for the BLER is adjusted, and therefore a difference can be generated between error rates of the terminals 3 and 4. As a result, wireless communication from the terminal 2 to the terminal 3 can be prevented from being intercepted by the terminal 4. In particular, in this example of FIG. 13, an amount of φ to be added to a reception phase $\varphi_{AA}$ and/or a reception phase $\varphi_{BA}$ that have been measured is controlled on the basis of a standard deviation of the reception phase, and therefore conditions for $\Delta\varphi$ that makes it difficult for the terminal 4 to perform interception can be extracted on the basis of an actual communication environment. Note that a case where an amount of a phase $\Delta\varphi$ is determined on the basis of a standard deviation of a reception phase is an example, and the amount of the phase $\Delta\varphi$ may be determined according to any method based on a reception phase.

Figure 14:
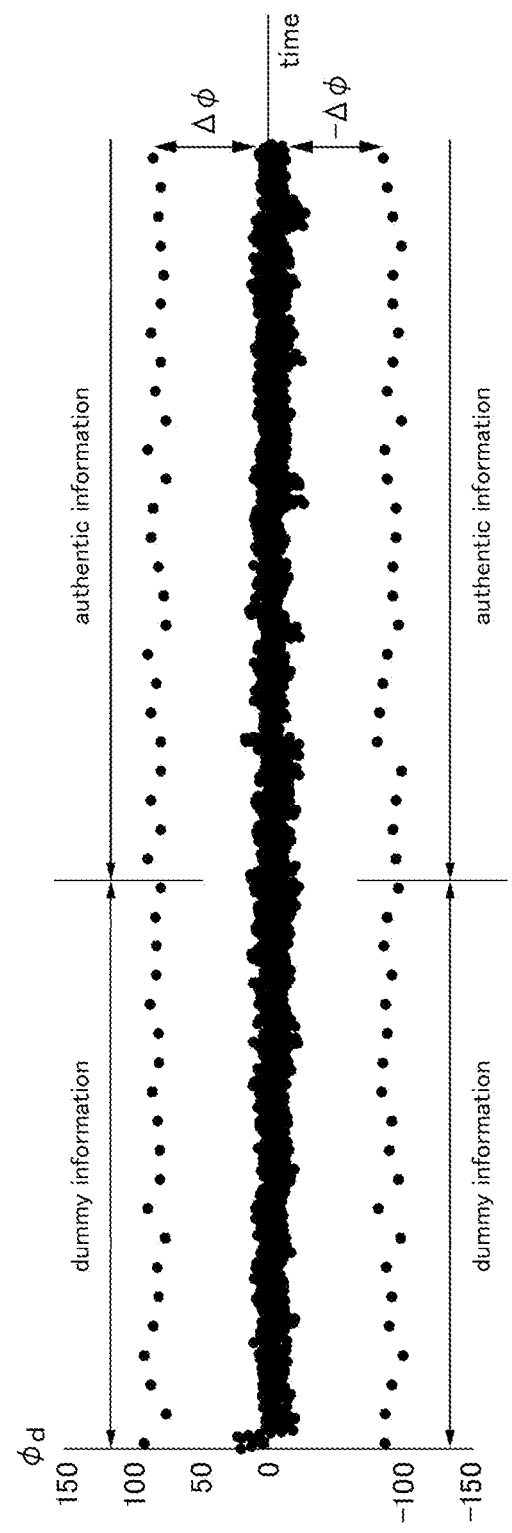
FIG. 14 is a diagram illustrating an example where dummy information or authentic information is included in a data group including $\pm\Delta\varphi$ in a timely manner.

According to the present invention, a positive or negative sign of φ to be added as a phase may be changed at all times. FIG. 14 illustrates a time-series change in a propagation time in a case where positive and negative signs of $\Delta\varphi$ to be added as a phase are alternately switched and $\Delta\varphi$ is added. Positive and negative signs of a phase $\Delta\varphi$ to be added are alternately switched, and therefore three states in total, a non-modulation time, the case of a positive propagation time, and the case of a negative propagation time, can be obtained. Communication can be performed by embedding information in each of the states described above. Stated another way, a data group in which changes in a time difference or a propagation time due to an added phase $\Delta\varphi$ are arranged in time series can be generated.

In the present invention, dummy information or authentic information may be included in this data group in a timely manner. For example, as illustrated in FIG. 14, in such a data group, a time-series range including dummy information is separated from a time-series range including authentic information. A side of the terminal 2 may determine which time-series range includes dummy information or authentic information. In such a case, the terminal 2 may determine, at random, which time-series range includes dummy information or authentic information. In such a case, a side of the terminal 2 inserts a flag at the beginning of a data string in which authentic information will be transmitted. Therefore, even if a time-series range changes at random, a side of the terminal 3 can determine which is authentic information.

In contrast to inserting a flag, the terminal 2 can also insert $\Delta\varphi$ at an intermittent timing or at random, under the assumption that the terminal 3 can extract $\Delta\varphi$ but the terminal 4 serving a third party that desires to intercept $\Delta\varphi$ fails to extract $\Delta\varphi$. This makes it difficult to notice superimposition of $\Delta\varphi$ in such a way that the terminal 4 does not focus on $\Delta\varphi$.

In the example described above of FIG. 14, description has been provided by using, as an example, a case where data groups in three states in total are generated by alternately switching positive and negative signs of $\Delta\varphi$ to be added as a phase and adding $\Delta\varphi$, but this is not restrictive. $\Delta\varphi$ to be added as a phase may continue to be added intermittently without alternatingly switching positive and negative signs. In such a case, data groups in two states in total are generated, and dummy information or authentic information may be included in such data groups in a timely manner.

Figure 15:
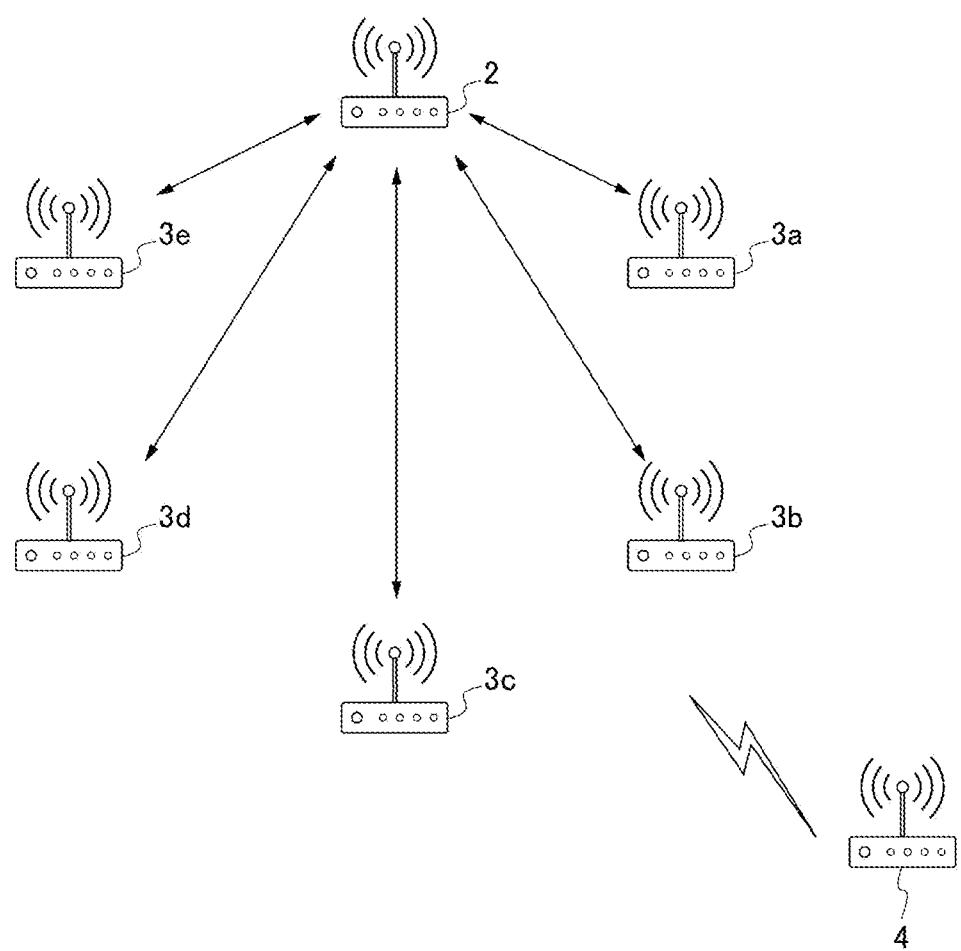
FIG. 15 is a diagram illustrating an example where a wireless communication network includes a terminal serving as a leader and a plurality of terminals serving as a follower.

Note that the present invention can be applied to a case where a wireless communication network includes a terminal 2 serving as a leader and terminals 3a to 3e serving as a follower, as illustrated in FIG. 15. The terminal 2 serving as a leader transmits a reception phase that the terminal 2 itself has received to the respective terminals 3a to 3e in a state where information is included in $\Delta\varphi$ described above. As a result, each of the terminals 3a to 3e that have received this reception phase can read concealed information by using a change in a propagation time or a time difference due to $\Delta\varphi$. In such a case, each of the terminals 3a to 3e transmits a random phase to the terminal 2 instead of reporting a reception phase, and this can confuse the terminal 4 that makes an attempt to intercept the phase.

In addition, the terminals 3a to 3e serving as a follower can similarly perform cryptographic communication. In such a case, for example, in a case where the terminal 3a performs secret communication to the terminal 3e, the terminal 3a similarly performs modulation according to $\Delta\varphi$ on a reception phase of a signal that has been transmitted by the terminal 3a itself and a reception phase of a signal that has been received from the terminal 3e, and reports the reception phases to the terminal 3e. The terminal 3e receives such a report, and can read modulated information by using a change in a time difference or a propagation time, similarly to the description above.

What is claimed is:

1. A wireless communication system that performs mutual wireless communication between terminals to perform time difference measurement and propagation time measurement, the wireless communication system comprising:
    a first terminal and a second terminal that transmit a signal at least once in attempting space-time synchronization, wherein:
        the first terminal measures a reception phase $\varphi_{AA}$ of a signal that the first terminal itself has transmitted, and a reception phase $\varphi_{BA}$ of a signal that the second terminal has transmitted, adds a positive or negative phase $\Delta\varphi$ to at least one of the reception phase $\varphi_{AA}$ and the reception phase $\varphi_{BA}$ that have been measured, and reports at least one of the reception phase $\varphi_{AA}$ and the reception phase $\varphi_{BA}$ to the second terminal,
        the second terminal measures a reception phase $\varphi_{BB}$ of a signal that the second terminal itself has transmitted, and a reception phase $\varphi_{AB}$ of a signal that the first terminal has transmitted, and reports, to the first terminal, the reception phase $\varphi_{BB}$ and the reception phase $\varphi_{AB}$ that have been measured, and
        the first terminal and the second terminal further obtain a time difference or a propagation time between the first terminal and the second terminal in accordance with a reception phase that has been measured by a local device or has been reported from a counterpart, and obtain information based on a phase $\Delta\varphi$ that has been reflected in the time difference or the propagation time that has been obtained.

2. The wireless communication system according to claim 1, wherein at least one of the first terminal and the second terminal transmits a signal obtained by causing an internally mounted oscillator to change a transmission phase at random or by a predetermined amount.

3. The wireless communication system according to claim 1, further comprising:
    a noise addition unit that adds noise that changes in time series in a propagation environment between the first terminal and the second terminal.

4. The wireless communication system according to claim 1, wherein the first terminal controls an amount of the phase $\Delta\varphi$ to be added to the at least one of the reception phase $\varphi_{AA}$ and the reception phase $\varphi_{BA}$ that have been measured, in accordance with the reception phase.

5. The wireless communication system according to claim 1, wherein:
    the first terminal continues to intermittently add a phase $\Delta\varphi$ at an arbitrary timing in reporting the at least one of the reception phase $\varphi_{AA}$ and the reception phase $\varphi_{BA}$ that have been measured, and makes a data group to include dummy information or authentic information at an arbitrary timing in generating the data group, and
    changes in the time difference or the propagation time due to the phase $\Delta\varphi$ that has been added are arranged in time series in the data group.

6. A wireless communication system that performs mutual wireless communication between terminals to perform time difference measurement and communication propagation time measurement, the wireless communication system comprising:
    a first terminal and a second terminal that transmit a signal at least once in attempting space-time synchronization, wherein:
        the first terminal measures a reception phase $\varphi_{AA}$ of a signal that the first terminal itself has transmitted, and a reception phase $\varphi_{BA}$ of a signal that the second terminal has transmitted, adds a positive or negative phase $\Delta\varphi$ to at least one of the reception phase $\varphi_{AA}$ and the reception phase $\varphi_{BA}$ that have been measured, and reports at least one of the reception phase $\varphi_{AA}$ and the reception phase $\varphi_{BA}$ to the second terminal, and
        the second terminal measures a reception phase $\varphi_{BB}$ of a signal that the second terminal itself has transmitted, and a reception phase $\varphi_{AB}$ of a signal that the first terminal has transmitted, obtains a time difference or a propagation time between the first terminal and the second terminal in accordance with the reception phase $\varphi_{BB}$ and the reception phase $\varphi_{AB}$ that have been measured and the at least one of the reception phase $\varphi_{AA}$ and the reception phase $\varphi_{BA}$ that have been reported from the first terminal, and obtains information based on a phase $\Delta\varphi$ that has been reflected in the time difference or the propagation time that has been obtained.

\* \* \* \* \*